(12) United States Patent
Oda et al.

(10) Patent No.: US 7,663,540 B2
(45) Date of Patent: Feb. 16, 2010

(54) SERVER DEVICE, MOBILE TERMINAL AND POSITIONING MODE SELECTING METHOD

(75) Inventors: Yasuhiro Oda, Yokosuka (JP); Jiyun Shen, Yokohama (JP); Takefumi Yamada, Kawasaki (JP)

(73) Assignee: NTT DoCoMo, Inc., Tokyo (JP)

( * ) Notice: Subject to any disclaimer, the term of this patent is extended or adjusted under 35 U.S.C. 154(b) by 5 days.

(21) Appl. No.: 11/756,279

(22) Filed: May 31, 2007

(65) Prior Publication Data
US 2007/0279281 A1 Dec. 6, 2007

(30) Foreign Application Priority Data
May 31, 2006 (JP) ............................ P2006-152432

(51) Int. Cl.
*G01S 1/02* (2006.01)
*G01S 3/02* (2006.01)
(52) U.S. Cl. .................. 342/357.06; 342/457; 701/213
(58) Field of Classification Search ................ 342/457, 342/357.06, 357.14, 357.15; 701/213, 215
See application file for complete search history.

(56) References Cited
U.S. PATENT DOCUMENTS
2003/0125045 A1 7/2003 Riley et al.
2005/0020309 A1 1/2005 Moeglein et al.

FOREIGN PATENT DOCUMENTS

| JP | 10-47982 | 2/1998 |
| JP | 10-82847 | 3/1998 |
| JP | 2005-20216 | 1/2005 |
| JP | 2005-531940 | 10/2005 |
| WO | WO 01/33302 A2 | 5/2001 |
| WO | WO 2005/004528 A1 | 1/2005 |

OTHER PUBLICATIONS

"Positioning System/ Present state of High Accuracy positioning technology and Service deployment", 2$^{nd}$ Basement level of Promotion of Machine Industry Hall Symposium, Institute of Electronics, Information and Communication Engineers, Tokyo branch, May 3, 2006, 14 Pages, (with English Translation).

*Primary Examiner*—Dao L Phan
(74) *Attorney, Agent, or Firm*—Oblon, Spivak, McClelland, Maier & Neustadt, L.L.P.

(57) ABSTRACT

A calculation server estimates a position of a mobile terminal that communicates with a base station incorporated with received global positioning system satellite signals. The calculation server includes a positioning information analyzer configured to select one of the positioning modes to be used out of a cell/sector positioning mode and a hybrid positioning mode on the basis of a distance between a cellular base station and the mobile terminal, and a position detector configured to calculate the position of the mobile terminal in the positioning mode selected by the positioning information analyzer.

6 Claims, 6 Drawing Sheets

ESTIMATED POSITION

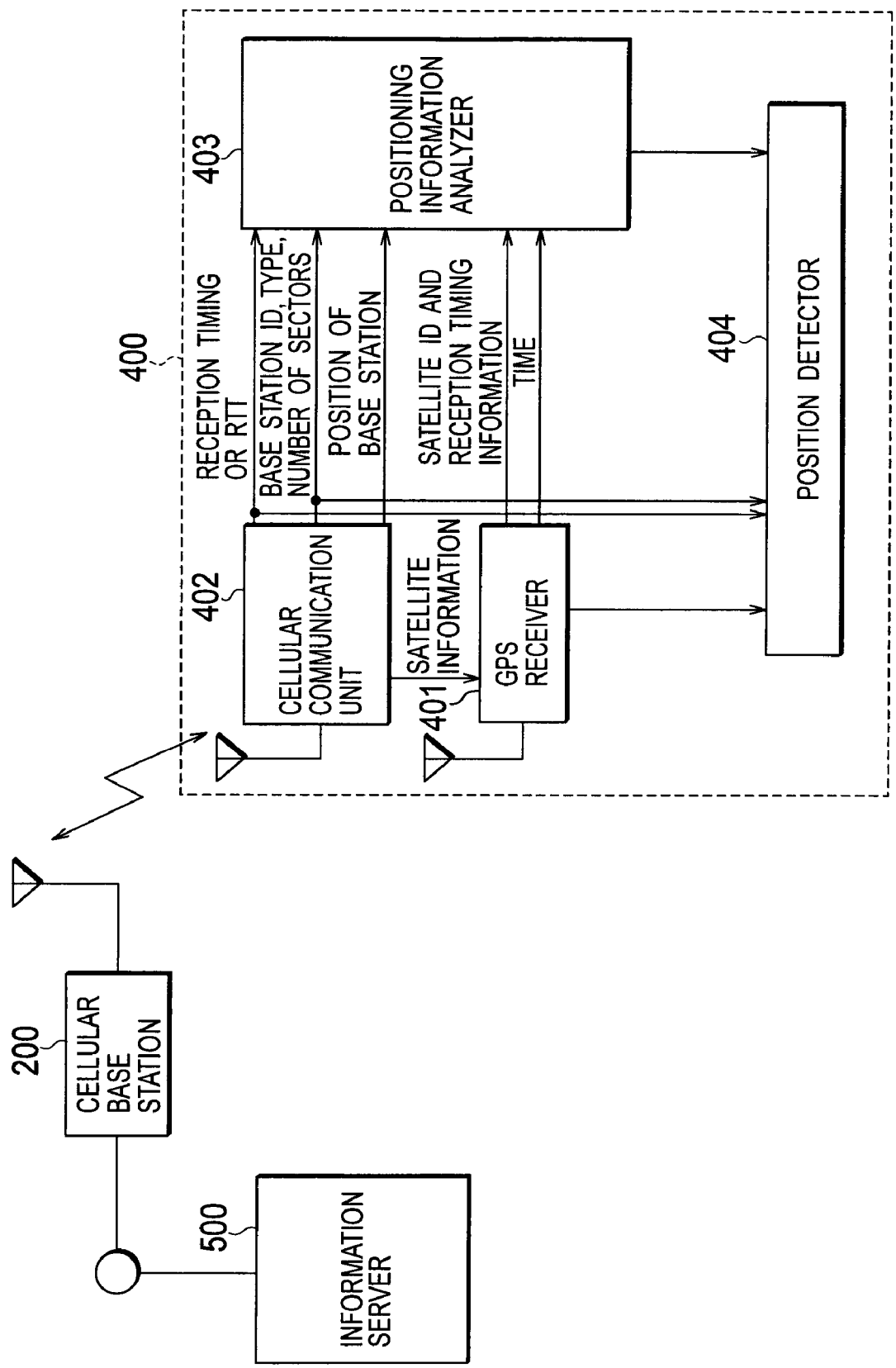

SERVER DEVICE, MOBILE TERMINAL AND POSITIONING MODE SELECTING METHOD

CROSS REFERENCE TO RELATED APPLICATIONS

This application is based upon and claims the benefit of priority from the prior Japanese Patent Application No. P2006-152432, filed on May 31, 2006; the entire contents of which is incorporated herein by reference.

BACKGROUND OF THE INVENTION

1. Field of the Invention

The present invention relates to a server device, a mobile terminal, and a positioning mode selecting method configured to select one positioning mode out of multiple positioning modes.

2. Description of the Related Art

A positioning method has heretofore been disclosed, for example, in Japanese Patent Application Laid-open Publication No. 2005-20216. In this example, the positioning method is configured to incorporate a global positioning system (GPS) receiver in a mobile terminal and to specify a position of the terminal by use of only signals from GPS satellites or both of the signals from the GPS satellites and a signal from a cellular base station. In an outdoor environment where there are no obstructing objects, the mobile terminal can receive sufficient signals from GPS satellites. Accordingly, the mobile terminal can receive the signals from four or more GPS satellites in many places.

In the positioning method using the GPS satellites, values of X, Y, and Z as three-dimensional coordinates and time of reception by the terminal are unknown. For this reason, it is essential to receive the signals from at least four GPS satellites. That is, it is possible to specify the position only by use of the GPS when the terminal can receive the signals from four or more GPS satellites.

In the meantime, the mobile terminal is also used in various places such as on a street canyon surrounded by large buildings or in an indoor place. In these environments, the mobile terminal is often unable to receive the signals from four or more of GPS satellites because the mobile terminal cannot catch weak signals from the GPS satellites. When the mobile terminal can only receive the signals from less than four GPS satellites, it becomes impossible to measure the position of the terminal only by use of the GPS satellites.

As a countermeasure for such a circumstance, a hybrid positioning mode is disclosed so as to achieve measurement of the position of the mobile terminal even when the terminal can receive the signals from less than four GPS satellites. The hybrid positioning mode is configured to treat a cellular base station as one of a signal emission source instead of the unreceivable GPS satellites.

Cellular base stations are treated as equivalent to the GPS satellites by measuring timing of signals transmitted from the cellular base stations so that four or more signal sources are obtained. In this way, it is possible to calculate the position of the mobile terminal in various places. In a special case, it is possible to calculate the position of the mobile terminal by receiving four or more signals that are transmitted from the base stations even when there are no receivable signals from the GPS satellites.

The above-described mode requires at least four receivable signal sources including the GPS satellites and the cellular base stations. The number of signal sources receivable by the mobile terminal varies depending on the surrounding conditions of the mobile terminal, and in some places, the number of the receivable signals is less than four.

There is disclosed a cell/sector positioning mode as a countermeasure in this case. Specifically, the position of the cellular base station that covers a location of the mobile terminal is calculated as the position of the mobile terminal. When the cellular base station is sectorized itself, the center of each sector is applicable to the position. Meanwhile, it is possible to calculate a distance between the cellular base station and the mobile terminal when round trip time (RTT) is measurable. In this case, it is also possible to measure the position of the mobile terminal by use of this distance and sector information. The method of measuring the position of the mobile terminal by use of the cell/sector positioning mode is utilized as a fallback mode for a place where the GPS positioning or the hybrid positioning is inapplicable. This method can measure the position of the mobile terminal in anywhere of the service area for the mobile terminal.

As described above, there are several positioning modes for the mobile terminal. For example, there is a method which has been disclosed in: Text of a symposium "Applications and service development of a high-precision positioning system," held on Mar. 3, 2006 pp. 43-45. In this method, the positioning modes are selected among the GPS positioning, the hybrid positioning, and the cell/sector positioning in accordance with the location measurement results of the mobile terminal.

According to this document, the positioning mode is changed based on the number of receivable signal sources. Specifically, either the GPS positioning or the hybrid positioning is selected when there are four or more signal sources, and the cell/sector positioning is selected when there are less than four signal sources.

SUMMARY OF THE INVENTION

The cell/sector positioning is generally deemed to have lower measurement accuracy than the GPS positioning and the hybrid positioning. Consequently, the cell/sector positioning is selected when there are less than four signal sources from which a mobile terminal can receive the signals.

However, the received signal is deteriorated when the mobile terminal receives the signal from a cellular base station in a location on a street canyon or in an indoor place. Accordingly, there may be a case where it is not possible to achieve sufficient measurement accuracy by the GPS positioning or the hybrid positioning even when there are four or more receivable signal sources.

Meanwhile, in the cell/sector positioning, the estimation error is improved when density of the cell is higher. That is, a cell radius is proportional to the estimation error or accuracy. Consequently, in an urban area where the cell radius is small, the hybrid positioning often causes the deterioration of the measurement accuracy compared with by using the cell/sector positioning on a street canyon or in an indoor place.

In light of the foregoing problem, it is an object of the present invention to provide a server device, a mobile terminal, and a positioning mode selecting method for appropriately selecting a positioning mode to be used with smaller errors out of positioning modes applicable in a circumstance where it is not possible to measure a position of a mobile terminal only by use of the GPS.

To attain the object, a first aspect of the present invention provides a server device configured to receive a signal from a GPS satellite and to estimate a position of a mobile terminal for communicating with a base station. The server device includes (a) a positioning information analyzer configured to select one of the positioning modes to be used out of a cell/sector positioning mode and a hybrid positioning mode on the basis of a distance between the base station and the mobile terminal, and (b) a position detector configured to calculate the position of the mobile terminal in the positioning mode selected by the positioning information analyzer.

According to the server device of the first aspect, it is possible to select the positioning mode with smaller errors out of the positioning modes applicable in a circumstance where it is not possible to measure the position of the mobile terminal only by use of the GPS.

Meanwhile, in the server device according to the first aspect, the distance may be determined based on round trip time between the base station and the mobile terminal.

Meanwhile, the positioning information analyzer in the serve device according to the first aspect may be configured to calculate a predetermined threshold on the basis of an estimation error in the cell/sector positioning mode and of an estimation error in the hybrid positioning mode, to compare the distance with the predetermined threshold, and to select the cell/sector positioning mode when the distance is smaller than the predetermined threshold.

A second aspect of the present invention provides a mobile terminal configured to receive a signal from a GPS satellite and to communicate with a base station. The mobile terminal includes (a) a positioning information analyzer configured to select one of the positioning modes to be used out of a cell/sector positioning mode and a hybrid positioning mode on the basis of a distance between the base station and the mobile terminal, and (b) a position detector configured to calculate the position of the mobile terminal in the positioning mode selected by the positioning information analyzer.

A third aspect of the present invention provides a positioning mode selecting method for selecting a positioning mode to be used that is used for estimating a position of a mobile terminal configured to receive a signal from a GPS satellite and to communicate with a base station. The positioning mode selecting method includes the steps of (a) selecting one of the positioning modes to be used out of a cell/sector positioning mode and a hybrid positioning mode on the basis of a distance between the base station and the mobile terminal, and (b) calculating the position of the mobile terminal in the positioning mode selected by the positioning information analyzer.

According to the present invention, it is possible to provide a server device, a mobile terminal, and a positioning mode selecting method for appropriately selecting a positioning mode to be used with smaller errors out of positioning modes applicable in a circumstance where it is not possible to measure a position of a mobile terminal only by use of the GPS.

BRIEF DESCRIPTION OF THE DRAWINGS

FIG. 7 is a block configuration diagram showing a communication system of a modified example.

DESCRIPTION OF THE PREFERRED EMBODIMENTS

Figure 1:
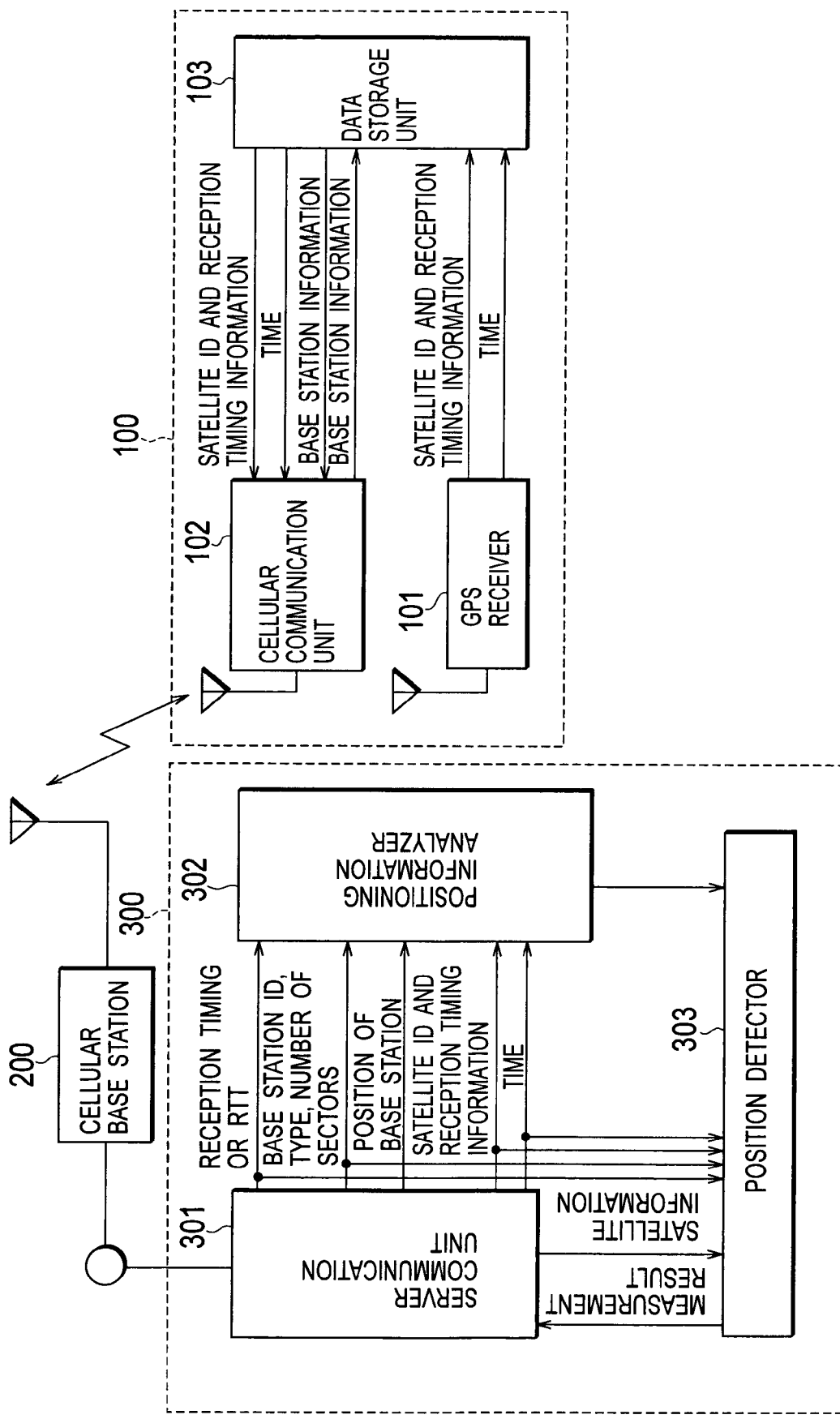
FIG. 1 is a block configuration diagram showing a communication system according to an embodiment of the present invention.

Next, embodiments of the present invention will be described with reference to the accompanying drawings. In the following description of the drawings, the same or similar constituents are designated by the same or similar reference numerals. It is to be noted, however, that the drawings are merely schematic.

(Configuration of Communication System)

A communication system according to an embodiment of the present invention includes a mobile terminal 100 configured to receive a signal from a global positioning system (GPS) satellite and to communicate with a cellular base station 200, the cellular base station 200, and a calculation server 300 configured to estimate a position of the mobile terminal 100.

The mobile terminal 100 receives the signal from the GPS satellite and communicates with the cellular base station 200. The mobile terminal 100 includes a GPS receiver 101, a cellular communication unit 102, and a data storage unit 103.

The GPS receiver 101 includes a GPS antenna configured to receive the signal from the GPS satellite, a radio frequency (RF) unit, a correlator, and a signal processor. The GPS receiver 101 identifies a unique number of the GPS satellite (such a number will be hereinafter referred to as a "satellite ID") by using information on a signal sequence of the GPS satellite included in the signal received by the GPS antenna.

The GPS receiver 101 calculates reception timing and reception time of the signal for each receivable GPS satellite. Then, the GPS receiver 101 transfers GPS satellite information containing the number of signal-receivable GPS satellites, the satellite IDs of the GPS satellites, the reception timing, and the reception time to the data storage unit 103.

The cellular communication unit 102 determines a cellular base station and a sector thereof for carrying out communication by receiving a pilot signal transmitted from the cellular base station 200. Here, the sector of the determined cellular base station will be referred to as a current sector. The cellular communication unit 102 transfers base station information containing a unique number of the base station (such a number will be hereinafter referred to as a "base station ID") and the current sector of the base station ID to the data storage unit 103.

Moreover, the cellular communication unit 102 transfers the GPS satellite information and the base station information saved in the data storage unit 103 to the calculation server 300 via the cellular base station 200 through a wireless communication line.

The data storage unit 103 stores the GPS satellite information transferred from the GPS receiver 101. Moreover, the data storage unit 103 stores the base station information transferred from the cellular communication unit 102.

The cellular base station 200 communicates with the mobile terminal 100. Moreover, the cellular base station 200 receives the GPS satellite information and the base station information from the mobile terminal 100. The cellular base station 200 transmits the GPS satellite information and the base station information thus received to the calculation server 300 via a network.

The cellular base station 200 measures round trip time (RTT) between the base station and the mobile terminal. Upon receipt of a request signal for RTT measurement from the calculation server 300, the cellular base station 200 transmits a request signal for starting the measurement to the mobile terminal 100. The cellular base station 200 measures the RTT by measuring transmission timing and reception timing. A result of RTT measurement is transmitted to the calculation server 300 via the network.

The calculation server 300 collects information necessary for the measurement (calculation) of the position of the mobile terminal 100 and calculates the position of the mobile terminal 100. The calculation server 300 transmits a result of the calculation to the mobile terminal 100. The calculation server 300 includes a server communication unit 301, a positioning information analyzer 302, and a position detector 303.

The server communication unit 301 receives the GPS satellite information and the base station information from the mobile terminal 100 via the cellular base station 200. The server communication unit 301 transfers the GPS satellite information and the base station information thus received to the positioning information analyzer 302. Meanwhile, the server communication unit 301 receives the information on the RTT, from the cellular base station 200, which is measured by the cellular base station 200. The server communication unit 301 transfers the received information on the RTT to the positioning information analyzer 302.

Further, the server communication unit 301 receives a calculation result of the position of the mobile terminal 100 from the position detector 303. The server communication unit 301 transfers the received calculation result of the position to the mobile terminal 100 via the cellular base station 200.

The positioning information analyzer 302 selects the optimal positioning mode on the basis of the GPS satellite information, the base station information, and the result of the RTT measurement. This embodiment applies three modes, namely, a GPS positioning, a hybrid positioning mode, and a cell/sector positioning mode.

The positioning information analyzer 302 estimates position estimation errors caused by these three positioning modes. The number of GPS satellites and the number of base stations usable for the position calculation, the reception timing of the signals, layouts of the satellites and the base stations, current sector information, and the result of the RTT measurement are used for this estimation. The method of estimation and a method of selecting the positioning mode will be described later.

The position detector 303 executes the position calculation of the mobile terminal 100 by use of the positioning mode selected by the positioning information analyzer 302, and transfers a result of the position calculation to the server communication unit 301.

(Positioning Mode Selecting Method)

Next, a method of selecting a positioning mode to be used according to this embodiment will be described with reference to FIG. 2.

First, the positioning information analyzer 302 of the calculation server 300 instructs the position detector 303 to attempt positioning only by use of the GPS (S201). Then, the position detector 303 judges whether or not it is possible to perform the measurement only by use of the GPS while utilizing the number of the GPS satellites that the mobile terminal 100 can receive the signals therefrom, i.e. the observable satellites and also utilizing a judgment of positioning errors (S202).

When it is possible to perform the positioning only by use of the GPS in Step S202, the positioning information analyzer 302 selects the GPS positioning as the applicable positioning mode. The position detector 303 calculates the position of the mobile terminal 100 by the GPS positioning and completes the process (S208).

On the other hand, when it is not possible to perform the positioning only by the GPS in Step S202, the position detector 303 sends a request for the RTT measurement to the cellular base station 200 via the server communication unit 301. The cellular base station 200 measures the RTT (S203).

Next, the positioning information analyzer 302 receives the base station information (the base station ID and the number of sectors) and the result of the RTT measurement from the base station 200 (S204). Then, the positioning information analyzer 302 finds a threshold X effectuating the cell/sector positioning on the basis of the base station ID and the number of sectors in accordance with a method to be described later (S205). The threshold X can be determined by carrying out simulation in advance and obtaining a relation between the RTT and the positioning errors (in terms of the cell/sector positioning and the hybrid positioning).

The positioning information analyzer 302 compares the measured RTT with the threshold X (S206). When X is smaller than the RTT in Step S206, the positioning information analyzer 302 selects the cell/sector positioning mode. The position detector 303 calculates the position of the mobile terminal 100 by use of the cell/sector positioning and completes the process (S209).

On the other hand, when X is equal to or larger than RTT in Step S206, a judgment is made as to whether it is possible to perform the hybrid positioning by use of the number of the observable GPS satellites, the number of the observable base stations, and the judgment of the positioning errors (S207). When it is possible to perform the hybrid positioning in Step S207, the positioning information analyzer 302 selects the hybrid positioning mode. The position detector 303 calculates the position of the mobile terminal 100 by use of the hybrid positioning and completes the process (S210).

On the other hand, when it is not possible to perform the hybrid positioning in Step S207, the positioning information analyzer 302 selects the cell/sector positioning mode. The position detector 303 calculates the position of the mobile terminal 100 by use of the cell/sector positioning and completes the process (S210).

Next, an example of a method of calculating the threshold X in Step S205 will be described. In the calculation of the threshold X, the estimation errors in the cell/sector positioning and the estimation errors in the hybrid positioning are calculated and an intersection point of these errors is obtained.

Figure 3:
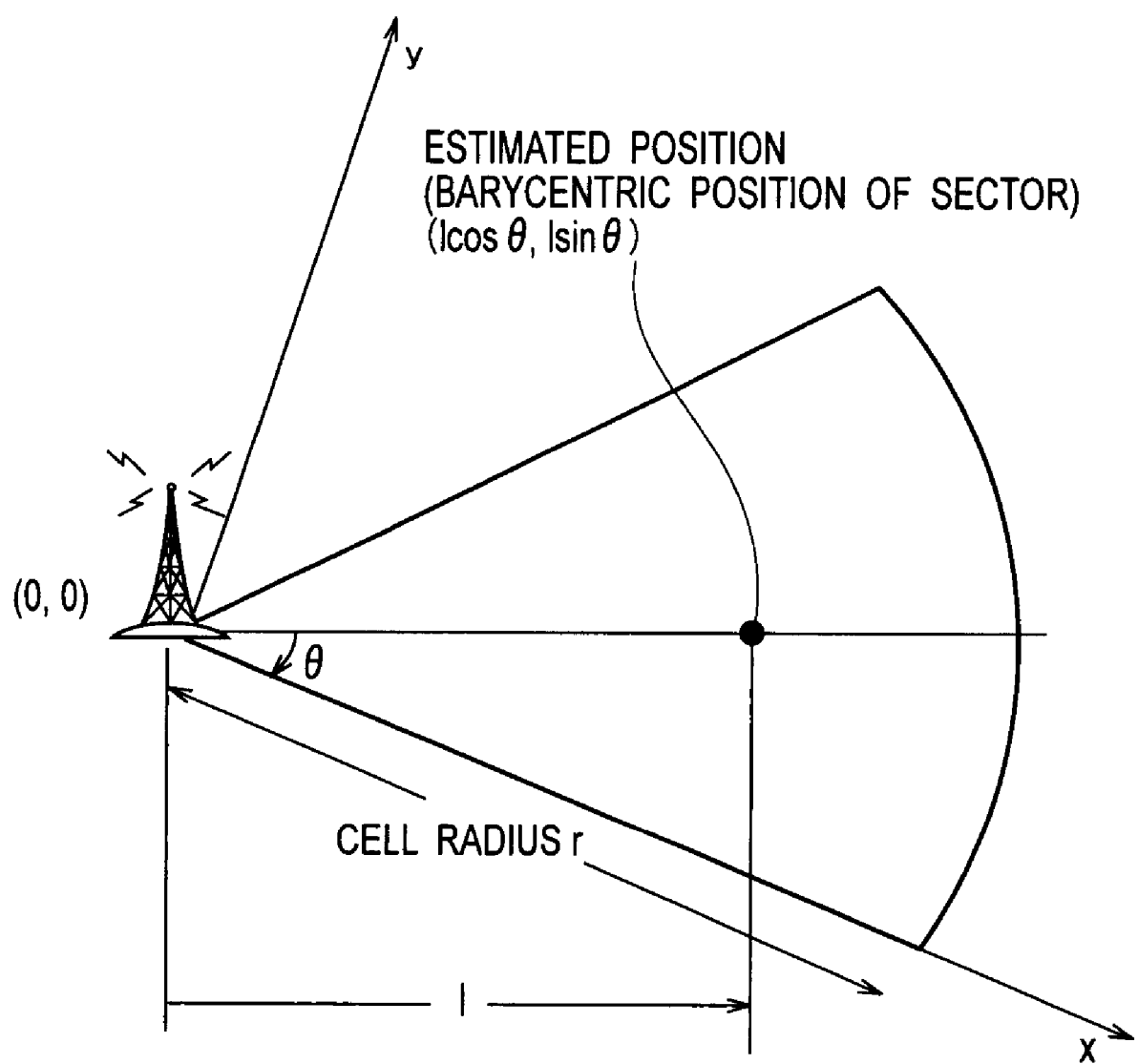
FIG. 3 is a diagram for explaining a sector ID positioning mode according to the embodiment.

First, a method of calculating the estimation errors E_sector of the cell/sector positioning will be described. In the cell/sector positioning, a barycentric position of the current sector covering the mobile terminal 100 is obtained as show in FIG. 3 and this position is determined as a positioning result. Next, distance between all points in the sector and the barycentric position of the sector are obtained. These values constitute the estimation errors in terms of the respective points. The estimation errors in the respective points are summed up and then divided by the area of the sector to obtain an average estimation error E_sector.

Meanwhile, the estimation errors in the hybrid positioning are calculated as follows. In the hybrid positioning, a trilateration survey is conducted by use of the distances between the GPS satellites and the mobile terminal calculated by the reception timing of the signals from the GPS satellites and by use of the distance between the cellular base station and the mobile terminal calculated by the RTT between the cellular base station and the mobile terminal.

Here, the hybrid positioning applying two GPS satellites and one RTT between the cellular base station and the mobile terminal will be considered. When distance errors between the GPS satellites and the mobile terminal are defined as σ_GPS1 and σ_GPS2 and a distance error between the cellular base station and the mobile terminal is defined as σ_BS, a position estimation error E_Hybrid in the hybrid positioning can be expressed by the following formula (1):

$$E\_Hybrid = \{(\sigma\_GPS1)^2 + (\sigma\_GPS2)^2 + (\sigma\_BS)^2\}^{1/2} \quad \text{Formula (1)}$$

Concerning the factors σ_GPS1, σ_GPS2, and σ_BS, it is possible to perform the measurement several times and to apply root mean square (RMS) values thereof. Alternatively, it is also possible to estimate the factors σ_GPS1, σ_GPS2, and σ_BS by use of empirically determined values.

Figure 4:
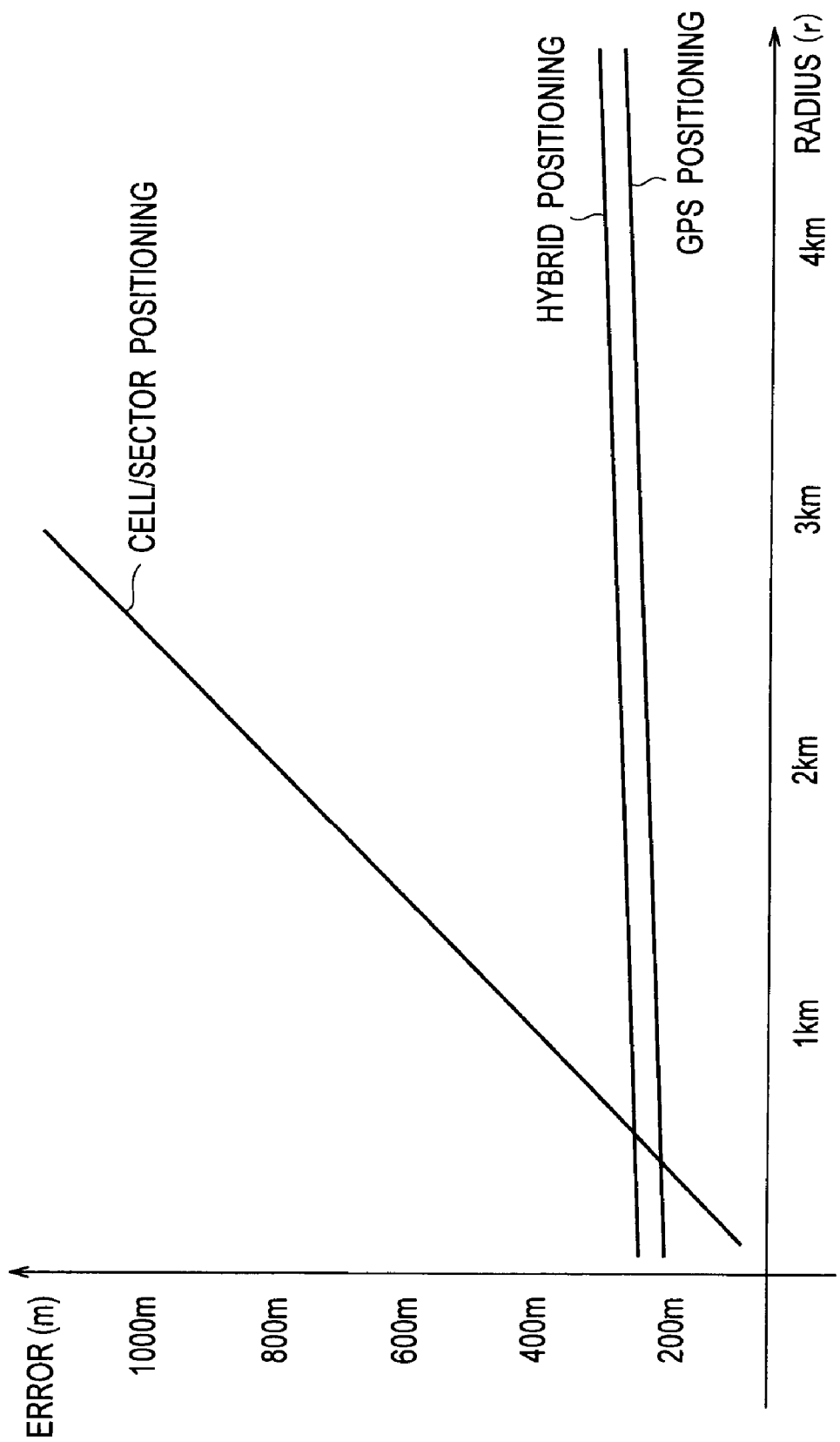
FIG. 4 is a graph showing simulation results of position estimation errors in cell/sector positioning and position estimation errors in hybrid positioning.

FIG. 4 shows an example of simulation results of the position estimation errors E_sector in the cell/sector positioning and the position estimation errors E_Hybrid in the hybrid positioning. As shown in FIG. 4, it is apparent that the E_sector and E_Hybrid have an intersection point. In this case, the threshold X applies the value of the intersection point.

The above-described method of selecting the positioning mode has been explained on the assumption that the cell/sector positioning applies the sector ID positioning mode which is configured to obtain the barycentric position of the sector covering the mobile terminal and to define the barycentric position as the measurement result. However, the cell/sector positioning may apply other modes.

Figure 5:
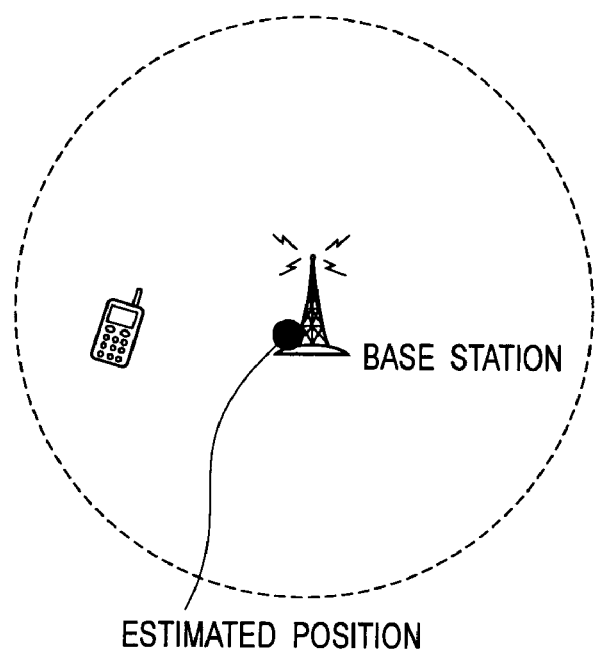
FIG. 5 is a diagram for explaining a cell ID positioning mode according to the embodiment.

For example, FIG. 5 shows a case of applying a cell ID positioning mode. In the cell ID positioning mode, the coordinates of the center of the cell are calculated by use of the longitude and the latitude of the base station and a current cell ID. In other words, the cell ID positioning mode is a mode of estimating the coordinates of the base station as the position of the mobile terminal.

Figure 6:
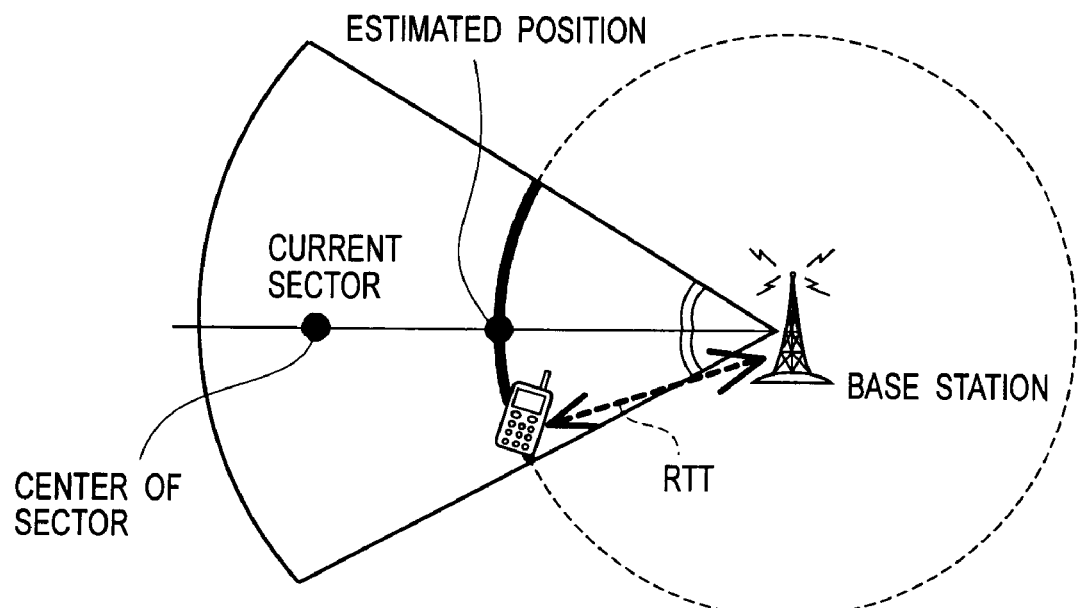
FIG. 6 is a diagram for explaining an RTT positioning mode according to the embodiment.

Meanwhile, FIG. 6 shows a case of applying an RTT positioning mode. The RTT positioning mode is a mode of estimating an intersection point of a circle calculated by use of the RTT and the center line of the sector as the position of the mobile terminal.

Figure 2:
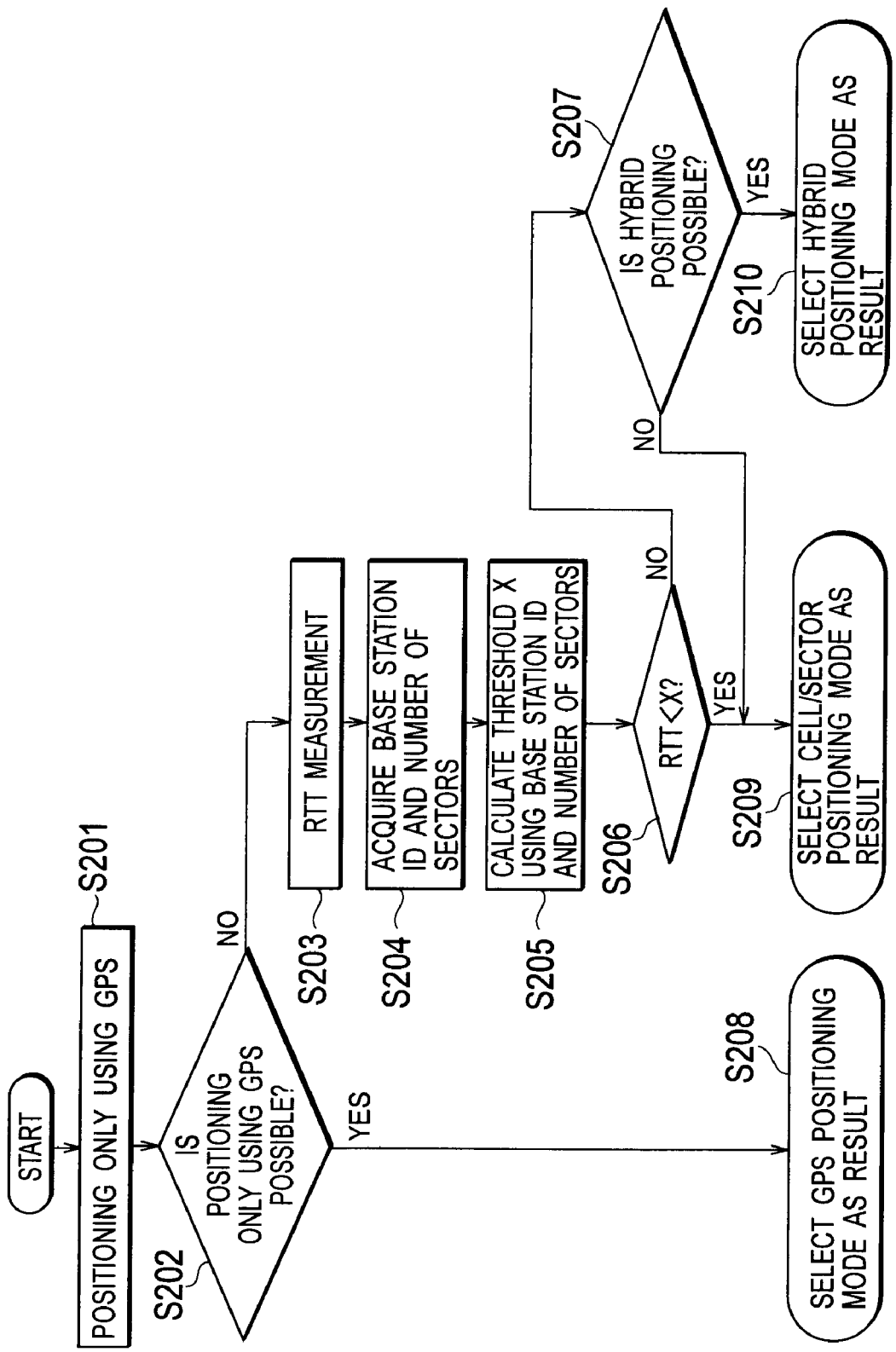
FIG. 2 is a flowchart showing a method of selecting a positioning mode to be used according to the embodiment.

In the meantime, when the cell/sector positioning mode is selected in Step S209 in FIG. 2, it is possible to select one of the positioning modes out of the sector ID positioning mode, the cell ID positioning mode, and the RTT positioning mode described above precisely in response to the number of the observable GPS satellites, the number of the base stations usable for measuring the RTT, and the type of the cell. The type of the cell may be a sector cell or an omni-cell, for example.

(Modified Example)

Here, a modified example of the communication system according to the present embodiment will be described with reference to FIG. 7. As shown in FIG. 7, in the communication system according to the modified example, a mobile terminal 400 collects the information necessary for selecting the positioning mode. Specifically, the mobile terminal 400 selects the optimal positioning mode by use of the number of the observable GPS satellites, the number of the observable base stations, and the measurement result of the RTT, so as to calculate the position of the mobile terminal 400.

The communication system according to the modified example includes a cellular base station 200, the mobile terminal 400, and an information server 500.

The cellular base station 200 communicates with the mobile terminal 400. Moreover, the cellular base station 200 measures round trip time (RTT) between the cellular base station 200 and the mobile terminal 400. Upon receipt of a request signal for RTT measurement, the cellular base station 200 transmits a request signal for starting the measurement to the mobile terminal 400. The cellular base station 200 measures the RTT by measuring the transmission timing and the reception timing.

Then, the cellular base station 200 transmits a result of the RTT measurement to the mobile terminal 400 through a wireless communication line.

The mobile terminal 400 receives the signal from the GPS satellite and communicates with the cellular base station 200 so as to calculate the position.

A GPS receiver 401 includes a GPS antenna configured to receive the signal from the satellite, a RF unit, a correlator, and a signal processor. The GPS receiver 401 identifies the satellite ID by using the information on the signal sequence of the GPS satellite included in the signal received by the GPS antenna, and calculates reception timing and reception time of the signal for each receivable GPS satellite. Then, the GPS receiver 401 transfers the GPS satellite information containing the number of signal-receivable GPS satellites, the satellite IDs of the GPS satellites, the reception timing, and the reception time to a position detector 404.

A cellular communication unit 402 determines the cellular base station and the sector thereof for carrying out communication by receiving the pilot signal transmitted from the cellular base station 200. Then, the cellular communication unit 402 transfers the base station information containing the base station ID and the current sector of the base station ID to a positioning information analyzer 403.

Moreover, the cellular communication unit 402 receives the result of the RTT measurement from the cellular base station 200. The cellular communication unit 402 transfers the result of the RTT measurement, which is received from the cellular base station 200, to the positioning information analyzer 403.

The positioning information analyzer 403 selects the optimal positioning mode on the basis of the GPS satellite information, the base station information, and the result of the RTT measurement. As described previously, the GPS positioning, the hybrid positioning mode, and the cell/sector positioning mode are used as the positioning modes.

The positioning information analyzer 403 estimates the position estimation errors of these three positioning modes. The number of GPS satellites and the number of base stations usable for the position calculation, the reception timing of the signals, the layouts of the satellites and the base stations, the current sector information, and the result of the RTT measurement are used for this estimation. The method of selecting the positioning mode is the same as the method described with reference to FIG. 2.

The position detector 404 executes the position calculation of the mobile terminal 400 by use of the positioning mode selected by the positioning information analyzer 403.

The positioning mode selecting method in this modified example is similar to the flowchart shown in FIG. 2, and a description thereof will be omitted herein.

(Operations and Effects)

According to the method of selecting the positioning mode by using the calculation server 300 and the mobile terminal 100 of this embodiment, it is possible to select either the cell/sector positioning mode or the hybrid positioning mode to use on the basis of the distance between the cellular base station 200 and the mobile terminal 100, and thereby to calculate the position of the mobile terminal 100 by use of the selected positioning mode.

For this reason, it is possible to select the positioning mode causing smaller errors out of the positioning modes applicable in the circumstance where it is impossible to measure the position only by use of the GPS.

Alternatively, it is possible to use the RTT directly instead of the distance between the cellular base station 200 and the mobile terminal 100.

Moreover, in this embodiment, the predetermined threshold is calculated based on the estimation errors in the cell/sector positioning and the estimation errors in the hybrid positioning. Further, the predetermined threshold is compared with the distance between the cellular base station and the mobile terminal, and then the cell/sector positioning mode is selected when the distance is smaller than the predetermined threshold.

Conventionally, in the cell/sector positioning is generally deemed to have less measurement precision than the hybrid positioning. Nevertheless, there is sometimes a case in which the cell/sector positioning can achieve higher precision, for example, in an urban area where the cell size is small. In this embodiment, even in such a case, it is possible to select the positioning method causing smaller measurement errors.

Moreover, when selecting the positioning mode, it is also possible to select the positioning mode in response to the type of the cell of the base station, in addition to the distance. For example, it is possible to select the optimal positioning mode more practically by selecting the positioning mode on the basis of whether the cell is a sector cell or an omni-cell.

What is claimed is:

1. A server device configured to receive a signal from a global positioning system satellite and to estimate a position of a mobile terminal for communicating with a base station, comprising:
    a positioning information analyzer configured to select one of a cell/sector positioning mode or a hybrid positioning mode, based on a distance between the base station and the mobile terminal; and
    a position detector configured to calculate the position of the mobile terminal in the positioning mode selected by the positioning information analyzer, said position detector further configured to calculate the position of the mobile terminal using data from the global positioning system satellite in a hybrid mode and to calculate the position of the mobile terminal without using data from the global positioning system satellite in a cell/sector positioning mode.

2. The server device according to claim 1, wherein the distance is determined based on round trip time between the base station and the mobile terminal.

3. The server device according to either claim 1 or claim 2, wherein the positioning information analyzer calculates a predetermined threshold on the basis of an estimation error in the cell/sector positioning mode and of an estimation error in the hybrid positioning mode, compares the distance with the predetermined threshold, and selects the cell/sector positioning mode when the distance is smaller than the predetermined threshold.

4. A mobile terminal configured to receive a signal from a global positioning system satellite and to communicate with a base station, comprising:
    a positioning information analyzer configured to select one of a cell/sector positioning mode or a hybrid positioning mode, based on a distance between the base station and the mobile terminal; and
    a position detector configured to calculate the position of the mobile terminal in the positioning mode selected by the positioning information analyzer, said position detector further configured to calculate the position of the mobile terminal using data from the global positioning system satellite in a hybrid mode and to calculate the position of the mobile terminal without using data from the global positioning system satellite in a cell/sector positioning mode.

5. A positioning mode selecting method for selecting a positioning mode to be used for estimating a position of a mobile terminal configured to receive a signal from a GPS satellite and to communicate with a base station, comprising the steps of:
    selecting one of a cell/sector positioning mode or a hybrid positioning mode based on a distance between the base station and the mobile terminal; and
    calculating a position of the mobile terminal based on the result of the selecting, wherein data from the GPS satellite is used in the hybrid mode, and data from the GPS satellite is not used in the cell/sector positioning mode.

6. The server device according to claim 1, wherein the positioning information analyzer is configured to select one of the cell/sector positioning mode or the hybrid positioning mode based on a radius of a cell covering a location of the mobile terminal.

* * * * *